United States Patent

Stock

(10) Patent No.: US 6,192,683 B1
(45) Date of Patent: Feb. 27, 2001

(54) DEVICE FOR CONVERTING THERMAL ENERGY INTO ELECTRICAL ENERGY

(76) Inventor: Gerhard Stock, Friedenseiche 1, Enkirch/Mosel (DE), D-56850

( * ) Notice: Subject to any disclaimer, the term of this patent is extended or adjusted under 35 U.S.C. 154(b) by 0 days.

(21) Appl. No.: 09/423,500
(22) PCT Filed: Apr. 30, 1998
(86) PCT No.: PCT/DE98/01203
   § 371 Date: Nov. 8, 1999
   § 102(e) Date: Nov. 8, 1999
(87) PCT Pub. No.: WO98/50697
   PCT Pub. Date: Nov. 12, 1998

(30) Foreign Application Priority Data

May 8, 1997 (DE) .............................................. 197 19 190

(51) Int. Cl.⁷ .................................................. F01B 29/10
(52) U.S. Cl. ............................................. 60/527; 60/508
(58) Field of Search .............................. 60/516, 527, 530, 60/650, 682, 529, 508

(56) References Cited

U.S. PATENT DOCUMENTS

| 3,152,554 | * | 10/1964 | Kofink | 60/529 X |
| 3,229,177 | * | 1/1966 | Clarke | 60/527 X |
| 3,339,077 | * | 8/1967 | Shapiro | 60/529 X |
| 4,014,170 | * | 3/1977 | Kitterman . | |
| 4,283,915 | * | 8/1981 | McConnell . | |
| 4,300,350 | * | 11/1981 | Becker . | |
| 4,439,987 | * | 4/1984 | Rideout . | |

FOREIGN PATENT DOCUMENTS

| 2906658 | * | 8/1980 | (DE) . |
| 19719190 | * | 11/1997 | (DE) . |
| 0175029 | * | 3/1986 | (EP) . |
| 2385910 | * | 10/1978 | (FR) . |

* cited by examiner

*Primary Examiner*—Hoang Nguyen
(74) *Attorney, Agent, or Firm*—Brown & Wood, LLP

(57) ABSTRACT

In a known device for converting of thermal energy into electrical energy which consists of a working circuit (2) with a working fluid for driving a turbo-engine (1) and of a plurality of heat exchanges (10) alternatively cross-flown by a cold and hot medium and in each of which an expansion element (9) is arranged that expands and contracts depending on the temperature of the medium, the temperature-dependent expansions and contractions of the expansion element (9) are immediately transmitted by a buffer storage to the working circuit. To avoid high requirements to the thermal insulation of suction and pressure conduits, it is proposed for storing a force, to associated a buffer storage formed as a spring (4) with each heat exchanger, where each spring (4) is connected with a piston (12) of a pressure cylinder (11) the working chamber (13) of which is connected by controllable valves and by the suction and pressure conduits (25, 15) with the working circuit.

3 Claims, 3 Drawing Sheets

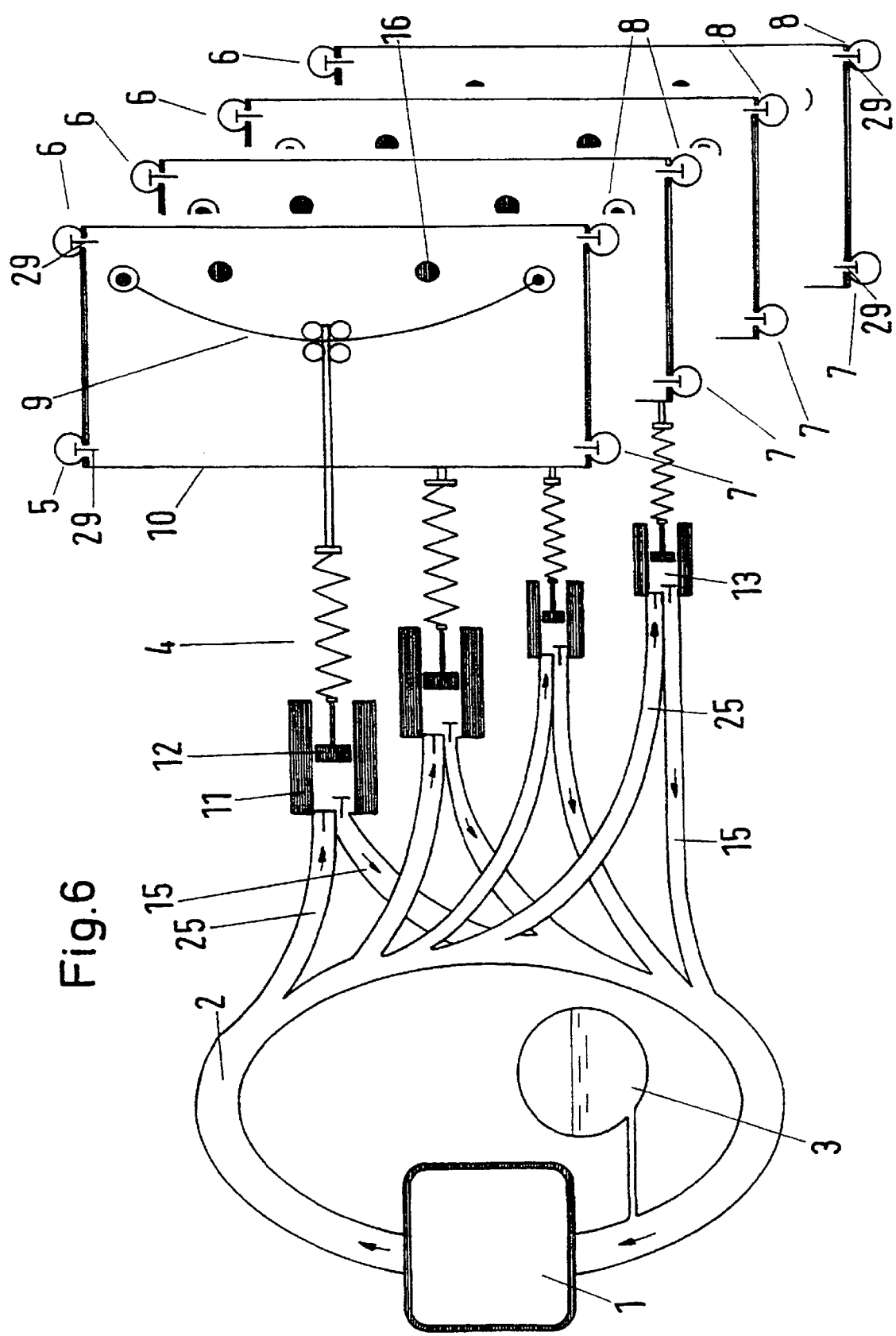

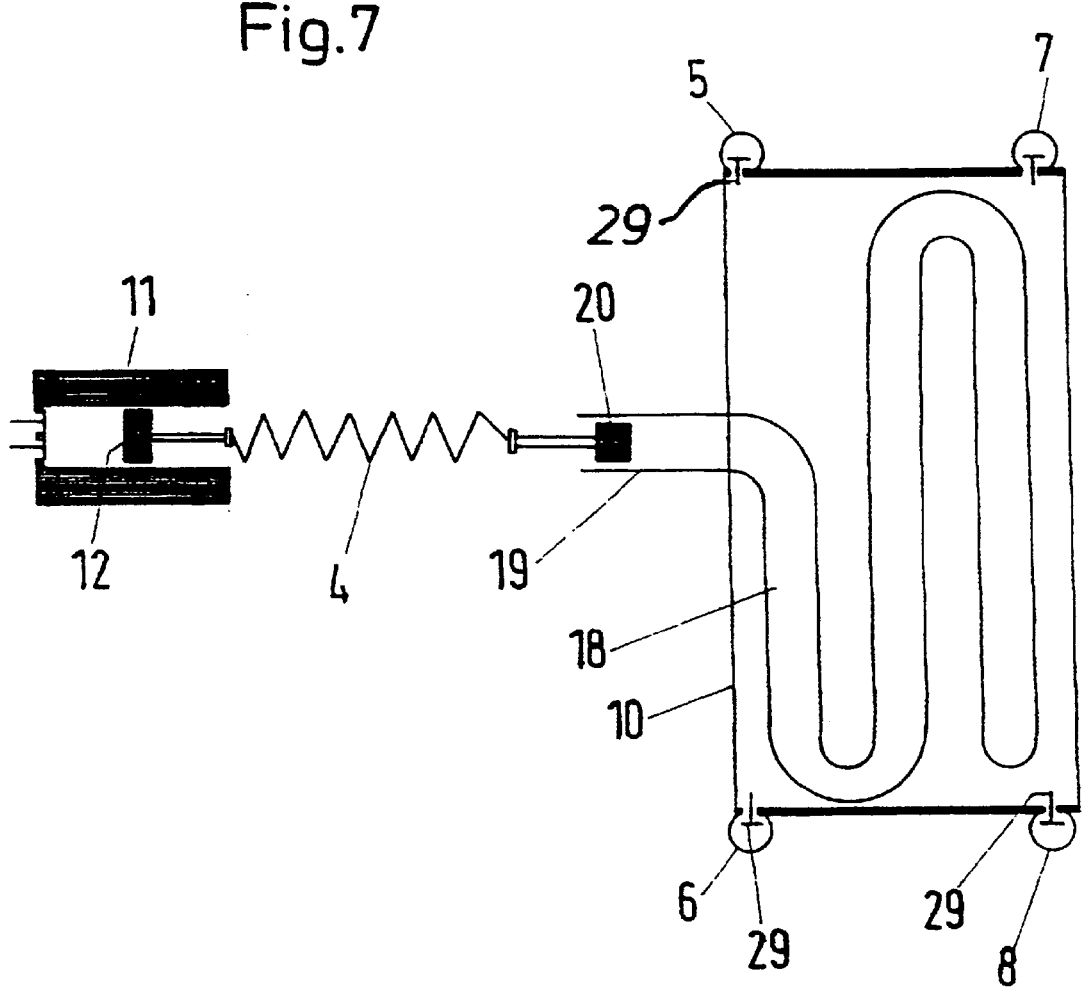

DEVICE FOR CONVERTING THERMAL ENERGY INTO ELECTRICAL ENERGY

Figure 1:
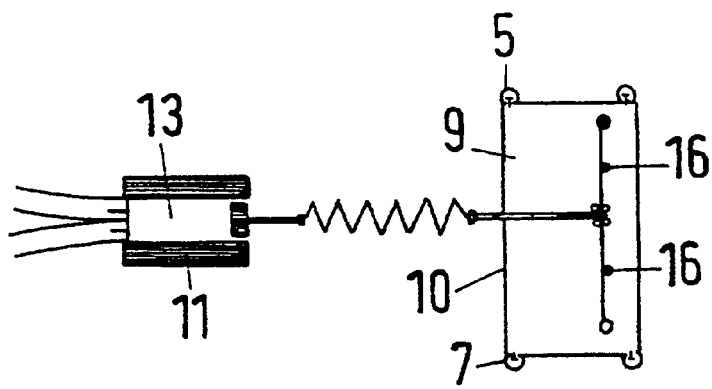

The present invention relates to a device for converting a thermal energy into an electrical energy, and including a working circuit with a working fluid for driving a turbo-engine and a plurality of heat exchangers through which, alternatively, cold and hot medium flows and in each of which is arranged an expansion element which expands or contracts dependent on the temperature of the medium and the expansion and contraction of which is transmitted to the working circuit by a buffer storage.

Up to present, the conversion of thermal energy into mechanical or electrical energy was effected with unecological means (internal combustion engines), uneconomical means (steam engines), or machines the functioning of which was associated with technical difficulties (hot gas or Stirling engines). Thus, the primary drawback of Stirling engines consists in that they should operate with high temperature differences in order to achieve a rapid cooling or heating of the expansion medium. The heat exchangers, which permit to achieve the desired aim are expensive, and the required seals, pistons and other components cannot yet be produced with an adequate quality with the contemporary technology. A comparatively satisfactory power up to the present could only be obtained from apparatuses which produce exclusively radiant heat.

U.S. Pat. No. 4,283,914 discloses a hot water engine for converting the thermal energy of the type described above according to the preamble of claim 1. The drawback of this device consists in that the working circuit is directly connected with the heat exchanges via a buffer storage. This means that numerous and long pressure and suction conduits need be heat-insulated to insure functioning of the device and, therefore, only liquid expansion medium can be used.

Proceeding from this known state of the art, it was proposed that for storing a force, a buffer storage, which is formed as a spring, be associated with each heat exchanger, with each spring being connected with a piston of a pressure cylinder the working chamber of which is connected by respective controllable valves and by suction and pressure conduits with the working circuit for driving a turbine with a generator.

The hot water engine according to the present invention permitted to avoid the problems of the prior art, while the number and the size of the heat exchanges and the driving pistons were increased to such a degree that the expansion medium has sufficient time for converting all of the delivered energy. The process is conducted rather slowly, however, separate cylinders can produce a much larger force, and the large number of expansion and pressure elements provide for a uniform oil circulation. A smaller speed permitted to eliminate the problems associated with Stirling processes to a most possible extent. These are dissipation due to pressure, gas and friction losses, dead space effect, small efficiency, heat and vibration losses, unfavorable piston control, and high gas velocity.

Advantageously, the expansion and contraction element is formed as a steel plate the temperature-dependent bulging and straightening of which acts on the spring.

In another advantageous embodiment, a liquid or gaseous medium is used as the expansion and contraction element, the changes of volume of which are transmitted to the spring via a pressure cylinder.

The invention, by way of example, is shown in the drawings. The drawings show:

FIGS. 1 through 5 schematic views of a heat exchanger with an expansion element formed of steel sheet material in different operational positions;

FIG. 6 a schematic view of a device according to the present invention for converting the thermal energy into the electrical energy; and FIG. 7 a schematic view of a heat exchanger with an expansion element formed by liquid or gaseous medium.

A heat exchanger 10, which is shown in FIGS. 1 through 5, has a chamber in which an expansion element, formed as a steel plate 9, which is restrained at its opposite ends, is arranged. Cold water can be delivered into the chamber through a cold water inlet 5 and discharged from the chamber through a cold water outlet 7. Hot water can be delivered into the chamber through a hot water inlet 6 and can be discharged from the chamber through a hot water outlet 8.

The flow of the cold and hot water through the cold water inlet 5 and the cold water outlet 7 and the hot water inlet 6 and the hot water outlet 8, respectively, is controlled with valves 29 (FIG. 6), wherein advantageously, control means is used together with a computer. At that, the cold water circuit and the hot water circuit are separated from each other. However, mixing of the cold and hot water would not present any problem in a case when the cold water is diverted from the return of heating means and the hot water is diverted from the supply of heating means (block-type thermal power stations). In this case, the discharged mixed water could be later delivered, in the case of heating, as a source of a primary energy, without any loss of energy, so that in the water circuit, only supply would have to be computer-controlled.

As shown in FIGS. 1 through 6, a spring 4 is attached, at one of its ends, to the steel plate 9, and its other end is connected with a piston 12 of a pressure cylinder 11.

As further shown in FIGS. 1 through 6, valves 14 connect the working chambers 13 of the cylinders 11 with suction conduits 25 and pressure conduits 15 which are connected with a working oil circuit 2 (FIG. 6) in which turbine 1 with a generator is arranged.

Further, pressure compensation reservoir 3 is connected with the working oil circuit 2.

Figure 2:
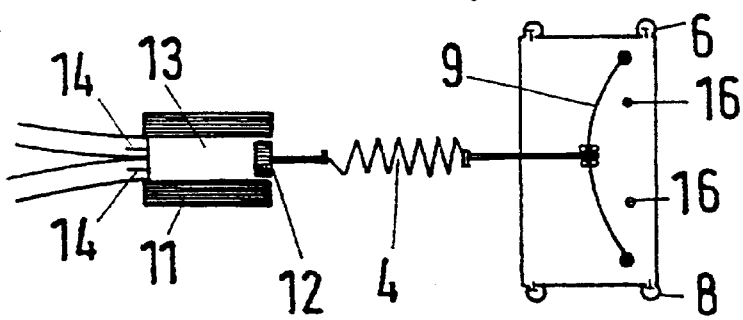
Figure 3:
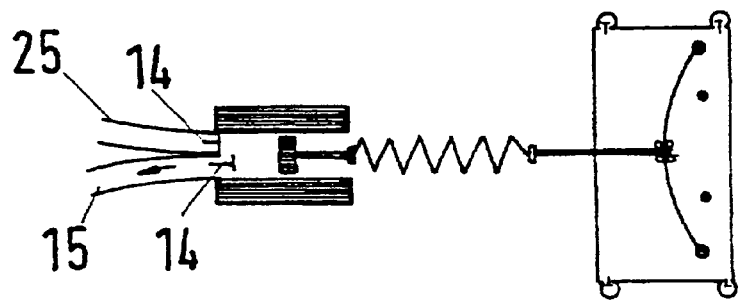
Figure 4:
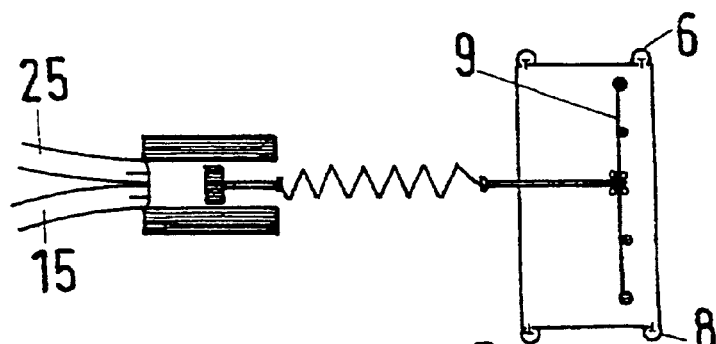

When in the position of the heat exchanger 10 shown in FIG. 1, hot water is supplied into the heat exchanger chamber through the hot water inlet 6, the steel plate 9, which is restrained at its opposite ends, will bulge, as shown in FIG. 2. A thrust member 16 prevents the steel plate 9 from bulging in an opposite direction. The force, which is generated as a result of bulging of the steel plate 9, is transmitted to the spring 4 which functions as a buffer storage, and the spring 4 becomes compressed.

At this, the control can release each time a corresponding valve 14 of the pressure cylinder 11, so that the available oil is delivered into the working chamber 13 through an associated pressure conduit 15 of the oil circuit 2 under the force generated by the compressed spring 4. The device at that occupies a position shown in FIG. 3.

Then, the computer control reverses corresponding valves of the heat exchanger 10, and the cold water is delivered to the heat exchanger 10. This results in the return of the restrained steel plate 9 into its initial position, shown in FIG. 4. The generated tension force is likewise stored in the spring 4 which becomes stretched.

Figure 5:
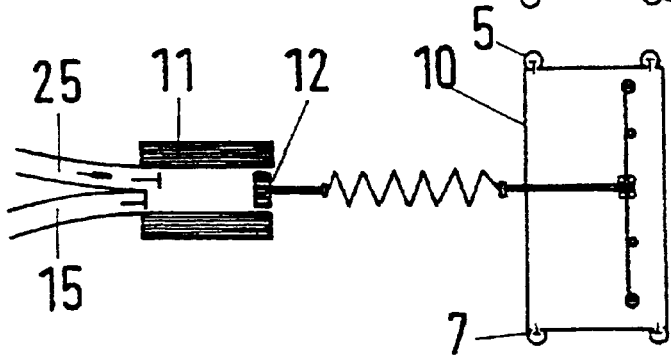

At that, the control can open a corresponding valve 14 of the pressure cylinder 11 so that oil is aspirated from the oil circuit 2 into the working chamber 13 of the pressure cylinder 11 through the suction conduit 25, whereby the piston 12 is pulled back by the force of the stretched spring 4 into the position shown in FIG. 5.

The valves 14 of separate pressure cylinders 11 are controlled one after the other in a time-dependent sequence in such a way that a most possible uniform oil circulation is insured.

In the embodiment of a heat exchanger 10 shown in FIG. 7, a tubular conduit 18, which acts as an expansion element and which is closed at one end, is provided in the heat exchanger chamber. The tubular conduit 18 is filled with liquid or gaseous medium. The other end of the tubular conduit is connected with a pressure cylinder 19 the piston 20 of which is connected with the buffer storage-forming spring 4.

In case where large forces and only a short travel path are to be expected, as in the embodiment with the steel plate 9, an intensifier can be provided in the transmission path to the pressure cylinder. The number of heat exchanger elements with pressure cylinders depends on the temperature difference of the water and on the size of separate heat exchangers and, thus, on the required work on one side and/or desired power on the other side.

Different heat exchanger elements can be produced and assembled in a modular design and, thus, accommodate to any spatial limitations because they have only cable connectors and hose or tubular connections, so that actually a larger space requirement would not matter.

The materials, from which different elements are produced are neither expensive nor maintenance-intensive. None of the system components is inflammable, explosive, or environmentally dangerous. In the case when the heat exchanger should be used with gas, regular air can be used.

Because the primary energy should only generate heat, the hot water engine can also be used for producing renewable pressures from generation of current, as well as the waste heat from other processes which until present, was possible only with extremely high temperatures of the steam and pressures and with a low efficiency. The hot water engine can theoretically be connected with any cheap heating installation.

The expected efficiency is very high because, with a sufficient insulation, practically no irradiation occurs, and mechanical losses, because of low friction and speeds, do not matter.

No noise generation and no emission of harmful materials are to be expected. The device is extremely noiseless and vibration-free. Because of an extremely little mechanical interaction, practically no wear exists, which also provides for a high reliability.

Because the device components do not require use of expensive materials or of special manufacturing processes, the manufacturing costs are relatively small, cost-effectiveness can be expected.

What is claimed is:

1. A device for converting a thermal energy into an electrical energy, comprising a working circuit with a working fluid for driving a turbo-engine and a plurality of heat exchangers through which, alternatively, cold and hot medium flows and in each of which is arranged an expansion element which expands and contracts dependent on the temperature of the medium and the expansion and contraction of which is transmitted to the working circuit by buffer-storage, characterized in that for storing of a force, a buffer storage formed as a spring (4) is associated with each heat exchanger, wherein each spring is connected with a piston (12) of a pressure cylinder (11) the working chamber (13) of which is connected by a controllable valve (14) and by suction and pressure conduits (25, 15) with the working circuit (2) which drives a turbine (1) with a generator.

2. A device according to claim 1, characterized in that the expanding and contracting expansion element is formed as a metal sheet (9) the temperature-dependent bulging and flattening of which acts on the spring (4).

3. A device according to claim 1, characterized in that the expansion element includes an expanding and contracting liquid or gas medium the volumetric change of which is transmitted by a pressure cylinder (19) to the spring (4).

\* \* \* \* \*